United States Patent [19]

Urban

[11] Patent Number: 4,642,839
[45] Date of Patent: Feb. 17, 1987

[54] DEVICE FOR THE RECIPROCATING LINEAR DRIVE OF A PART

[75] Inventor: Peter Urban, Meerbusch, Fed. Rep. of Germany

[73] Assignee: Eduard Küsters, Krefeld, Fed. Rep. of Germany

[21] Appl. No.: 741,868

[22] Filed: Jun. 6, 1985

[30] Foreign Application Priority Data

Sep. 6, 1984 [DE] Fed. Rep. of Germany ....... 3421632

[51] Int. Cl.$^4$ ............... B31F 1/14; F16H 21/18
[52] U.S. Cl. ............... 15/256.53; 74/50; 74/570; 101/157; 162/281
[58] Field of Search ............... 15/256.53; 101/157, 101/169; 74/50, 55, 570; 162/281

[56] References Cited

U.S. PATENT DOCUMENTS

| | | | |
|---|---|---|---|
| 1,867,981 | 7/1932 | Mudd | 74/570 X |
| 3,130,438 | 4/1964 | Hughes | 15/256.53 |
| 4,515,078 | 5/1985 | Difflipp | 101/157 |

Primary Examiner—Edward L. Roberts
Attorney, Agent, or Firm—Kenyon & Kenyon

[57] ABSTRACT

A device for the reciprocating linear drive of a part, especially of a scraper at a calender cylinder, comprises a driver connected to the scraper and having two mutually parallel oppositely disposed abutments and an eccentric disposed between the abutments. The eccentric has an outside diameter which is smaller than the distance between the abutments. The eccentric is designed as a double eccentric with a driven inner eccentric fixed to a rotary drive shaft and with a freely movable outer eccentric floatingly mounted to the inner eccentric via an antifriction bearing.

12 Claims, 12 Drawing Figures

DEVICE FOR THE RECIPROCATING LINEAR DRIVE OF A PART

BACKGROUND OF THE INVENTION

This invention relates to a device for driving a part with a reciprocating linear motion. More particularly, this invention relates to an eccentric included in such a device.

Such devices are known for driving an elongate scraper at a calender cylinder. The scraper serves to prevent a paper web from being wrapped around the calender cylinder in the event the paper web becomes torn. So that the scraper does not work into the calender cylinder and leave circular traces or grooves therein and does not wear itself at one or more points, it is necessary to move the scraper back and forth in a longitudinal direction at the surface of the calender cylinder. Through the reciprocating linear motion of the scraper, the development of traces on the calender cylinder is reduced.

With conventional drive designs, however, traces or grooves cannot be entirely eliminated because the scrapers are practically stationary at the reversal points of the driving eccentrics for short periods of time.

An object of the present invention is to provide an improved device for driving a part with a reciprocating linear motion.

Another object of the present invention is to provide such an improved device wherein the formation of traces or grooves at the calender cylinder and at the scraper is reduced.

Yet another object of the present invention is to provide an improved eccentric included in a device for driving a part with a reciprocating linear motion.

SUMMARY OF THE INVENTION

A device for driving a part with a reciprocating linear motion comprises, in accordance withh the present invention a pair of abutment members spaced a predetermined distance from one another, a link for rigidly connecting the abutment members to one another and to the part to be driven, a first eccentric, a power source, and a second eccentric. The first eccentric is disposed between the abutment members and is operatively connected to the power source, whereby the first eccentric is rotated about an axis of rotation. The second eccentric is also disposed between the abutment members and around the first eccentric. The second eccentric is floatingly mounted to the first eccentric so that the second eccentric is substantially freely rotatable with respect to the first eccentric. The second eccentric has a perimeter with a largest diametric dimension smaller than the predetermined distance between the abutment members so that the perimeter of the second eccentric can engage at most one of the abutment members.

Thus, in accordance with the present invention, an improved eccentric for use in an assembly for driving a part with a reciprocating linear motion comprises a first eccentric element and a second eccentric element. The first eccentric element is disposable between the abutment members of the driving assembly and rotatable about an axis of rotation, while the second eccentric element at least partially surrounds the first eccentric element and is floatingly mounted thereto so that the second eccentric element is freely rotatable with respect to the first eccentric element.

An eccentric designed as a double eccentric, i.e., having two eccentric elements, in accordance with the invention results in superposition of the motions of the two eccentrics such that the reversal points of the driven part are not always at the same location but move in a range determined by the eccentricities of the eccentric elements. The reversal points are thus "distributed" over a distance, so that the effect of the stationary reversal points prevailing in the conventional single eccentric drives is suppressed.

Essential to the invention is the fact that the outer eccentric continuously occupies different rotary positions relative to the inner eccentric. This result is brought about by the fact that the outer eccentric always engages no more than one abutment of the driver because of the play between the outer eccentric and the abuments. The contact with a given abutment takes place as long as the inner eccentric moves toward this abutment and presses the outer eccentric against it. At the opposite abutment, the circumferential or perimetral surface of the outer eccentric is exposed, i.e., spaced from the respective abutment. The outer eccentric rolls off at the contacted abutment parallel to the abutments, the rolling off corresponding to displacements caused by the inner eccentric. When the direction of motion of the inner eccentric turns towards an abutment, the outer eccentric comes into contact therewith upon after traversing the play, i.e., the distance between the abutments and the outer eccentric, the outer eccentric first disengaging the other abutment. During the contact and the rolling off, the outer eccentric again executes a rotation relative to the abutments. While the rotations, during different phases, have different directions and partially cancel each other, a resultant angle of rotation remains after one revolution of the inner eccentric. This resultant angle leads to the continuous rotation of the outer eccentric and a displacement of the reversal points.

So that circumferential forces transmitted from the inner eccentric to the outer eccentric by friction do not interfere with the rolling off of the outer eccentric, it is advantageous if the inner eccentric is supported in the outer eccentric via an antifriction bearing. The eccentricity of the two eccentrics can be equal.

DETAILED DESCRIPTION

Figure 1:
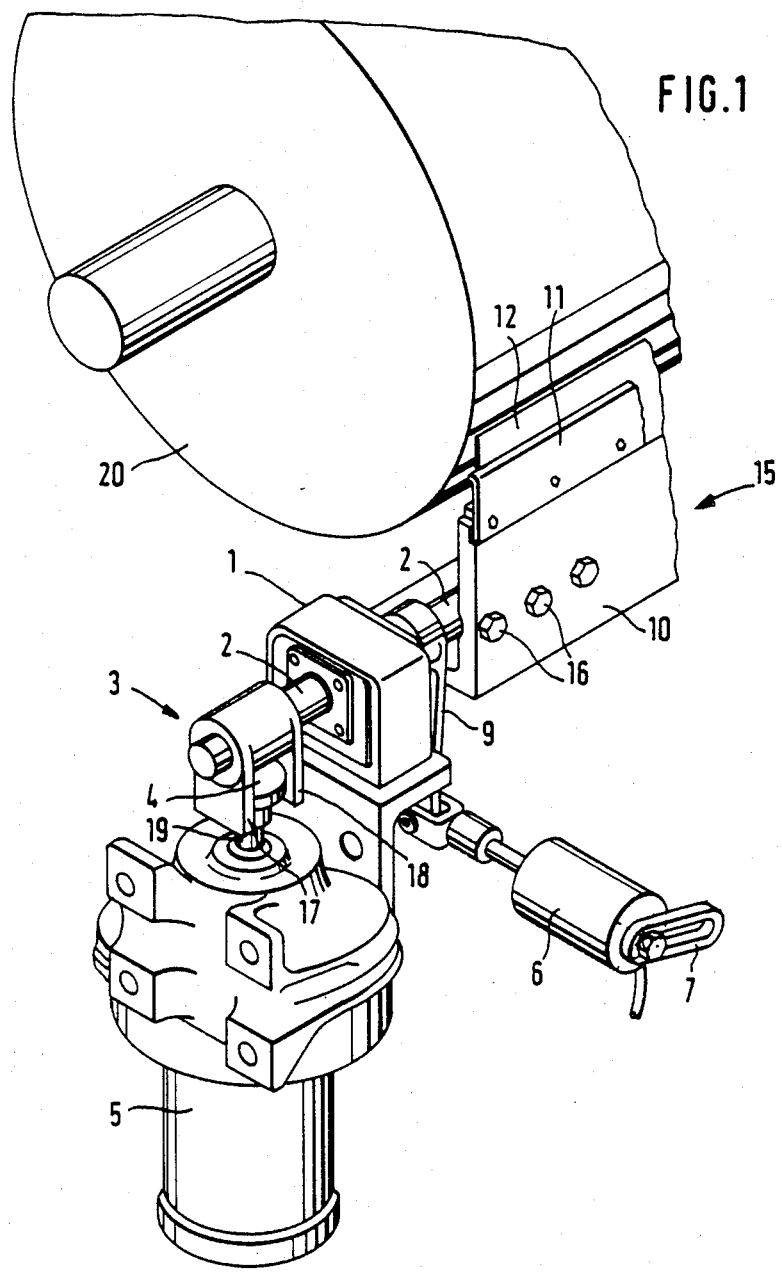
FIG. 1 is a partial perspective view of the drive of a scraper at a calender cylinder, the drive including a double eccentric in accordance with the present invention.

FIG. 1 shows an end portion of an individual calender cylinder 20 supported in the usual manner in a machine frame (not shown) and cooperating with counter rolls (not shown).

To ensure that the paper web is not wrapped around the calender rolls in the event of a tear, calender cylinder 20 is associated with a scraper 15 comprising a scraper beam 10, a knife holder 11 and a scraper knife 12, all of which extend substantially across the width of the paper web or the length of calender cylinder 20. Scraper beam 10 consists of a heavy angle section connected by means of screws 16 to a drive rod 2 which extends parallel to the axis of calender cylinder 20 and which is in turn slidably and pivotably mounted in a pillow block 1 fixed to the frame of the calender assembly. To drive rod 2 is fastened a setting lever 9 which can be rotated via an air cylinder 6 secured to the machine frame via a mounting support 7.

To the outer end of drive rod 2 is fastened a driver device 3 comprising two opposing abutments 17 and 18 in the form of a pair of flat plates oriented parallel to one another and perpendicular to the axis of the drive rod 2. In the illustrated embodiment, abutments 17 and 18 extend downwardly from drive rod 2 and a double eccentric device 4 mounted on a rotary output shaft 19 of a reduction gear motor 5 is disposed between the abutments. The gear reduction motor 5 is fastened to the machine frame.

By operating air cylinder 6, scraper 15 can be shifted to engage calender cylinder 20 or to disengage it. Through the action of eccentric 4, drive rod 2 thereby and thereby scraper 15 are caused to execute a reciprocating linear motion in a longitudinal direction parallel to the axis of calender cylinder 20.

Figure 2:
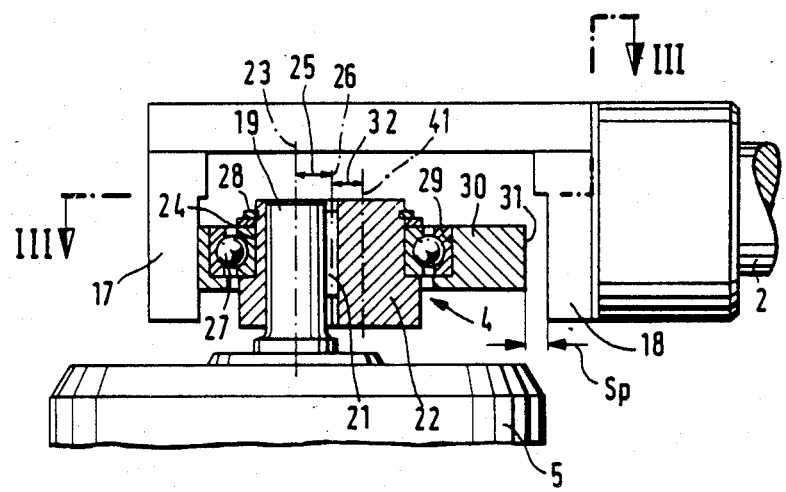
FIG. 2 is a side view of the driver shown in FIG. 1, partially in cross-section and on an enlarged scale.
Figure 3:
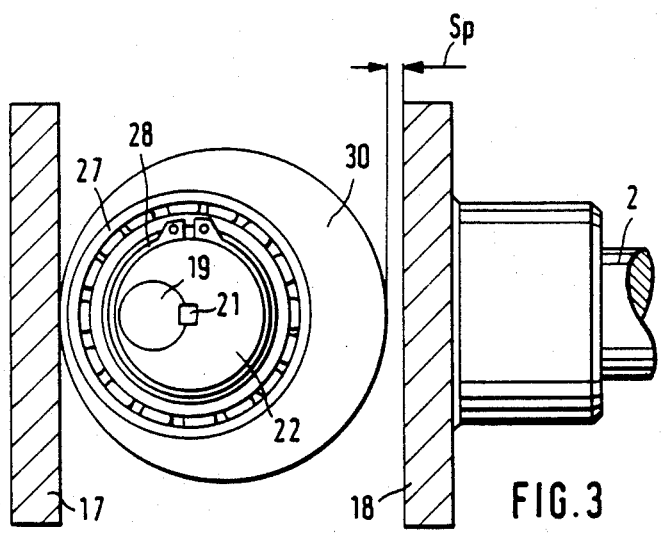
FIG. 3 is a top view, partly in cross-section, taken along line III—III in FIG. 2.

The structure of eccentric 4 is illustrated in detail in FIGS. 2 and 3. On output shaft 19 of reduction gear motor 5 is secured, by means of a key 21, an inner eccentric 22, substantially in the form of a cylinder having an axis of rotation which coincides with the axis of rotation 23 of drive shaft 19. Inner eccentric 22 has a cylindrical outer surface 24 and an axis of symmetry or geometric center 26 spaced from rotation axis 23 by a distance 25 representing the eccentricity of the inner eccentric. On the circumferential surface 24 of the inner eccentric is arranged a ball bearing 27 secured in the axial direction against a shoulder of the inner eccentric 22 by a snap ring 28. The outside circumference of ball bearing 27 is mounted in a cylindrical recess 29 of a substantially cylindrical outer eccentric 30. The outer eccentric has a cylindrical perimetral surface 31 which has a diameter less than the distance between abutments 17 and 18, whereby the outer eccentric fits with a play Sp between the abutments, i.e., is freely translatable a distance Sp in a direction parallel to drive rod 2. Outer eccentric 30 has an eccentricity defined by the distance 32 between the axis of symmetry of recess 29 and the axis of symmetry of perimetral surface 31, the axis of symmetry of recess 29 coinciding with the axis of symmetry 26 of inner eccentric 22.

The motion cycle of the double eccentric is shown in FIGS. 4 to 11. In these schematic drawings, the angular orientation of inner eccentric 22 is easily discernable from the position of key 21 and the angular orientation of outer eccentric 30 from a marking 33.

Figure 4:
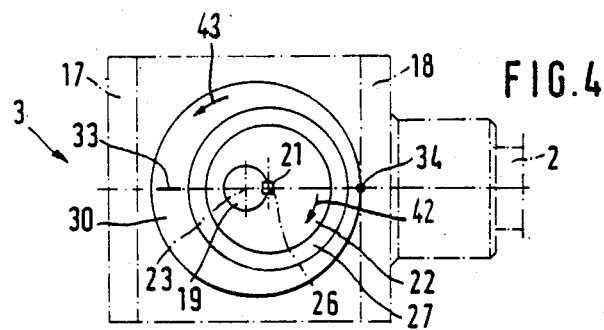
FIGS. 4 to 11 are schematic top views, similar to FIG. 3, showing different positions of rotation of the double eccentric illustrated in FIGS. 1-3.

FIG. 4 illustrates a starting position of the double eccentric. In the starting position the greatest excursion of eccentric 22 from its axis of rotation 23 is toward the right, i.e., toward abutment 18, while the greatest excursion of outer eccentric 30 from its axis of rotation 26 is toward abutment 17. Outer eccentric 30 engages abutment 18 at a contact point 34, so that the play between the outer eccentric and abutments 17 and 18 exists on the left side of eccentric 30 toward abutment 17.

Inner eccentric 22 revolves uniformly in a clockwise direction, as indicated by arrow 42 in FIG. 4. Arrow 43 on outer eccentric 30 indicates the direction of rotation which the outer eccentric had immediately prior to reaching the configuration shown in FIG. 4.

Figure 5:
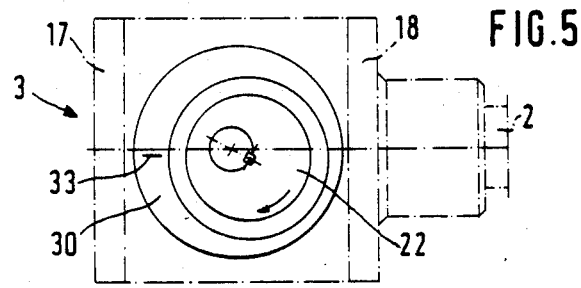

During the motion of inner eccentric 22 from the starting position in FIG. 4 through an angle of approximately 25° to the position illustrated in FIG. 5, outer eccentric 30 is shifted from abutment 18 towards abutment 17, the outer eccentric disengaging abutment 18. Because of the play Sp (see FIG. 3), outer eccentric 30 does not immediately contact abutment 17. Eccentrics 22 and 30 therefore move freely in this phase, and drive rod 2 is temporarily stationary.

Figure 6:
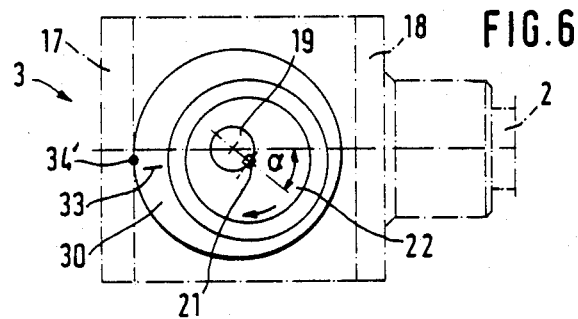

If inner eccentric 22 continues its rotaty motion from the position shown in FIG. 5, there is an instant at which the displacement of eccentrics 22 and 30 to the left is equal to the play Sp and outer eccentric 30 engages left abutment 17 at a contact point 34'. The configuration of the double eccentric at this instant is illustrated in FIG. 6. During the reversal process, inner eccentric 22 travels through a rotational angle α of approximately 40°, starting from the position in FIG. 4. This "contact angle of rotation" differs in accordance with the design and depends on the eccentricity of inner eccentric 22 and the play Sp.

It is to be noted that there are certain limits for the play Sp which are necessary for an operable arrangement. If the play Sp is larger than twice the eccencricity 25 of inner eccentric 22, outer eccentric 30 fails to reach abutments 17 and 18 and drive rod 2 remains stationary. Thus, the play must be less than double the eccentricity 25 of inner eccentric 22. In practice, the amount of play Sp is far below this maximum and is on the order of 1 mm for an outer eccentric 30 with a diameter on the order of 100 mm.

Beginning with the double eccentric configuration illustrated in FIG. 6, continued rotation of inner eccentric 22 causes outer eccentric 30 to shift drive rod 2 to the left. From this instant on, outer eccentric 30 begins to roll off at left abutment 17.

In FIGS. 4 to 11, the operating cycle is shown as if outer eccentric 30 were standing still without contacting one or the other of abutments 17 and 18, i.e., as if inner eccentric 22 were continuing to rotate without taking along the outer eccentric. In practice, this will not be the case. Outer eccentric 30 will always be partially constrained to rotate with inner eccentric 22.

Figure 12:
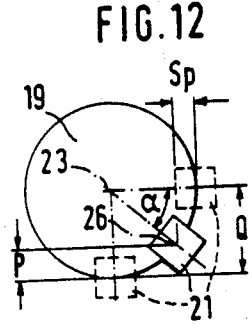
FIG. 12 is a detail of FIG. 6 shown schematically and on an enlarged scale.

In FIG. 12, drive shaft 19 and key 21 from FIG. 6 are shown on an enlarged scale. The position of inner eccentric 22 can be read from the position of key 21. The position shown in FIG. 4 corresponds to the position of key 21 shown in dashed lines at the top right of FIG. 12. From that angular orientation, drive shaft 19 and inner eccentric 22 rotate through angle α, until key 21 reaches the position shown in solid lines and outer eccentric 30 has reached, as illustrated in FIG. 6, abutment 17 at the contact point 34'. Since the axis of symmetry 26 of the cylindrical outer surface of inner eccentric 22 is located at the center of key 21, inner eccentric 22 shifts outer eccentric 30 from the position in FIG. 4 to the position in FIG. 6 by a distance equal to the play Sp (FIG. 12).

Figure 7:
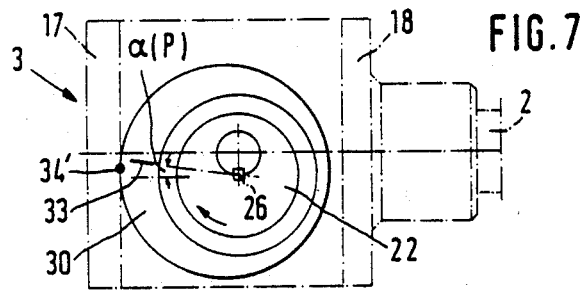

If inner eccentric 22, starting from the orientation in FIG. 6, continues to rotate to the orientation in FIG. 7, eccentrics 22 and 30 are shifted not only to the left but also to the bottom, as defined by FIGS. 4–11. In the process, outer eccentric 30 rolls off at abutment 17 in the direction indicated by an arrow in FIG. 7. The angle of rotation follows from the fact that the axis of rotation of outer eccentric 30, i.e., the axis of symmetry 26 of inner eccentric 22, is displaced from the position in FIG. 6 to the position in FIG. 7 by a distance P (FIG. 12) downward. Therefrom is obtained a certain rolling distance and an angle of rotation α(P) which is relatively small.

Figure 8:
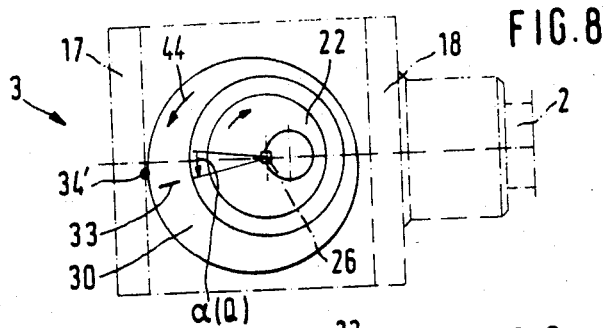

During continued rotation of inner eccentric 22 from the orientation shown in FIG. 7 to the orientation shown in FIG. 8 through the "left lower quadrant," inner eccentric 22 takes along the outer eccentric 30 upwardly while the latter rests against abutment 17, so that the roll-off direction is reversed and outer eccentric 30 executes a counter-clockwise rotation, as indicated by arrow 44 in FIG. 8. The axis of rotation 26 of outer eccentric 30 is displaced upwardly a distance Q (FIG. 12) and the corresponding angle of rotation α(Q) is larger than angle α(P) because of the greater displacement (Q relative to P).

Figure 9:
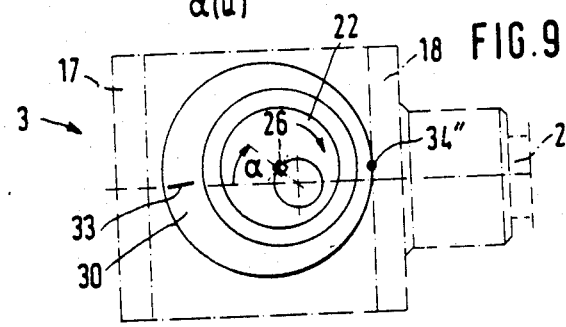

From the configuration of the double eccentric shown in FIG. 8, outer eccentric 30 is caused to break contact with abutment 17 and is displaced to the right by the inner eccentric 22 until the cylindrical perimetral surface 31 of outer eccentric 30 again engages right-hand abutment 18 at a contact point 34″, as shown in FIG. 9. Subsequently, outer eccentric 30 rolls off right-hand abutment 18 and executes in the process a rotation in the direction defined by angle α(P), ending up in the position illustrated in FIG. 10.

Figure 10:
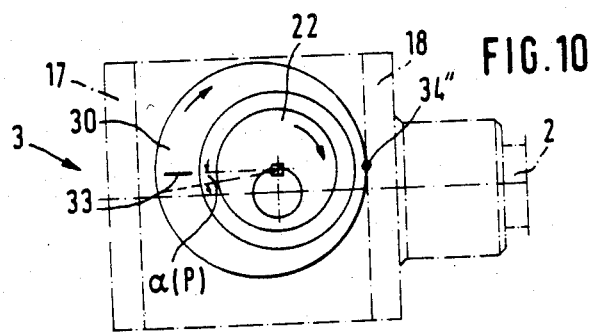
Figure 11:
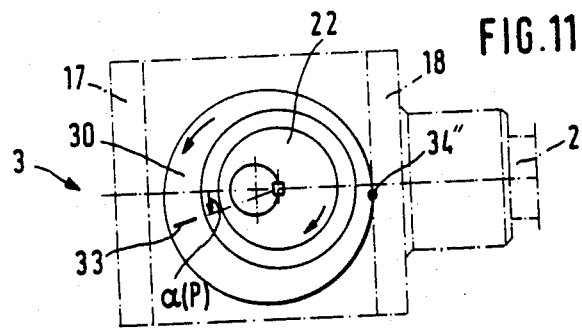

Starting from the position in FIG. 10, outer eccentric 30 is taken along downwardly by inner eccentric 22 and rolls off at right-hand abutment 18, and specifically again by the larger angle of rotation α(Q), up to the position shown in FIG. 11, in which inner eccentric 22 is again in the starting position illustrated in FIG. 4.

The outer eccentric 30, however, is not in the starting position, as can be seen from the position of mark 33 as compared to FIG. 4. Rather, a resultant angle of rotation of outer eccentric 30 relative to the abutments 17 and 18 has been obtained which came about as follows:

| Orientation Change | Clockwise | Counter-clockwise |
| --- | --- | --- |
| From FIG. 6 to FIG. 7 | α(P) | |
| From FIG. 7 to FIG. 8 | | α(Q) |
| From FIG. 9 to FIG. 10 | α(P) | |
| From FIG. 10 to FIG. 11 | | α(Q) |

The larger rotation contributions α(Q) are always counter-clockwise and the smaller rotation contributions α(P) clockwise. If all rotation contributions are added up, a counter-clockwise rotational displacement remains.

The entire sequence of steps illustrated in FIGS. 4–11 is based on the assumption that outer eccentric 30, unless it engages one of the abutments 17 or 18, remains stationary during the continuing rotation of inner eccentric 22, and is not rotatively entrained thereby. This assumption, however, is theoretical and will not hold true in practice. When inner eccentric 22 rotates clockwise, a certain circumferential force is transmitted to outer eccentric 30, which force tends to rotate the outer eccentric along with the inner eccentric and which depends on the resistance to rotation between eccentrics 22 and 30. The provision of ball bearing 27 between eccentrics 22 and 30 is not particularly intended to influence rotative entrainment in the case that eccentric 30 is free, but is intended to prevent the entrainment forces, as might be the case with a sliding bearing, from becoming so large that outer eccentric 30 slips when making contact with one of the abutments and therefore does not carry out the continuous rotation necessary for shifting the reversal points of the scraper 15.

The rolling off of the outer eccentric 30 at the abutments 17 and 18 produces a desired change in the positions of the reversal points even if the inner eccentric 22 rotatively entrains the outer eccentric 30 in the clockwise direction when eccentric 30 is disengaged from abutments 17 and 18. Between successive rotative entrainments, a slow rotation of outer eccentric 30 in the counter-clockwise direction takes place because of the rolling off, which slow rotation is superimposed on the intermittent rapid rotative entrainment of outer eccentric 30 by inner eccentric 22 and ensures that the successive reversals are always located at different points.

The desired shifting of the reversal points does not take place only in the theoretical case that the clockwise entrainment by inner eccentric 22 per revolution thereof exactly cancels the counterrotation of the outer eccentric 30 due to the rolling off. However, this case can be excluded in practice. In general, the rotative entrainment of outer eccentric 30 by inner eccentric 22 will be substantially larger than the counter-clockwise rotation of outer eccentric 30 due to the rolling off. Moreover, even if the angles should cancel each other on occasion, differences will arise very rapidly because of changes in the friction conditions, for instance, whether due to temperature changes or wear, and these differences will make the reversal points shift again.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. A device for driving a part with a reciprocating linear motion, comprising:
    a pair of abutment members spaced a predetermined distance from one another;
    linking means for rigidly connecting said abutment members to one another and to the part to be driven;
    a first eccentric disposed between said abutment members;
    power source means operatively connected to said first eccentric for rotating same about an axis of rotation; and
    a second eccentric disposed between said abutment members and around said first eccentric, said second eccentric being floatingly mounted to said first eccentric so that said second eccentric is substantially freely rotatable with respect to said first eccentric, said second eccentric having a perimeter with a largest diametric dimension smaller than said predetermined distance so that the perimeter of said second eccentric can engage at most one of said abutment members, said second eccentric being mounted to said first eccentric by means of an antifriction bearing.

2. The device recited in claim 1 wherein the eccentricity of said first eccentric is approximately equal to the eccentricity of said second eccentric.

3. The device recited in claim 2 wherein the part to be driven is an elongate scraper at a calender cylinder, said scraper having a length defining a longitudinal direction, said reciprocating linear motion taking place in said longitudinal direction.

4. The device recited in claim 1 wherein said first eccentric is a first cylinder having a first axis of symmetry spaced from said axis of rotation by a first distance, said second eccentric being a second cylinder having a second axis of symmetry spaced from said first axis of symmetry by a second distance.

5. The device recited in claim 4 wherein said second cylinder is provided with a cylindrical recess having an axis of symmetry coinciding with said first axis of symmetry.

6. The device recited in claim 5 wherein said first distance is approximately equal to said second distance.

7. An eccentric device for use in an assembly for driving a part with a reciprocating linear motion, said assembly including a pair of abutment members spaced a predetermined distance from one another and to the part to be driven, said eccentric device comprising:
- a first eccentric element disposable between the abutment members for rotation about an axis of rotation;
- a second eccentric element at least partially surrounding said first eccentric element and floatingly mounted thereto so that said second eccentric element is freely rotatable with respect to said first eccentric element; and
- means including an antifriction bearing for rotatably mounting said second eccentric element to said first eccentric element.

8. The eccentric device recited in claim 7 wherein said first eccentric element comprises a first cylinder and wherein said second eccentric element comprises a second cylinder, said bearing partially surrounding said first cylinder, said cylinders having respective axes of symmetry, said second cylinder being provided with a cylindrical recess having an axis of symmetry spaced from the axis of symmetry of said second cylinder, said first cylinder and said bearing being at least partially disposed in said recess, the axis of symmetry of said recess coinciding with the axis of symmetry of said first cylinder.

9. The eccentric device recited in claim 8 wherein said first cylinder is provided with a cylindrical bore for receiving a rotary drive shaft, further comprising keying means for rotatively fixing said first cylinder to said drive shaft.

10. The eccentric device recited in claim 9 wherein said cylindrical bore has an axis of symmetry spaced a first distance from the axis of symmetry of said first cylinder, the axis of symmetry of said cylindrical recess being spaced a second distance from the axis of symmetry of said second cylinder, said second distance being approximately equal to said first distance.

11. The eccentric device recited in claim 10 wherein said second cylinder has a diameter smaller than the predetermined distance between the abutment members.

12. The eccentric device recited in claim 11 wherein the part to be driven is an elongate scraper engageable with an external cylindrical surface of a calender roll, said scraper being driven in a longitudinal direction.

* * * * *